(No Model.)
F. H. BOLTE.
PNEUMATIC TIRE.
No. 479,203. Patented July 19, 1892.
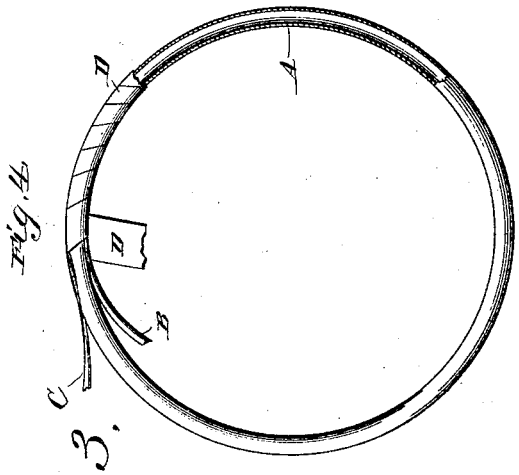
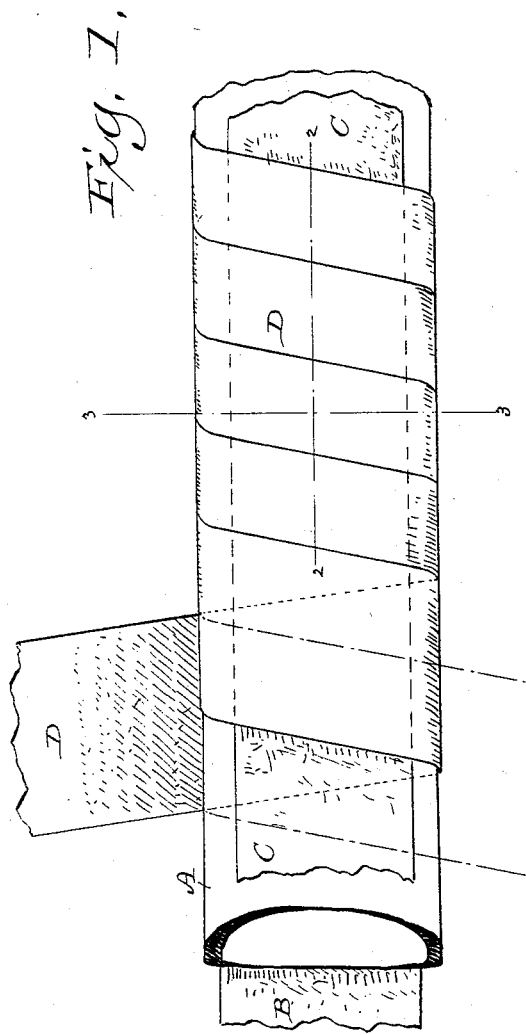
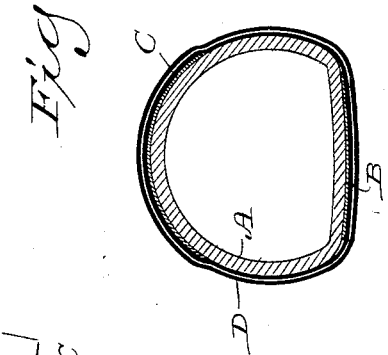
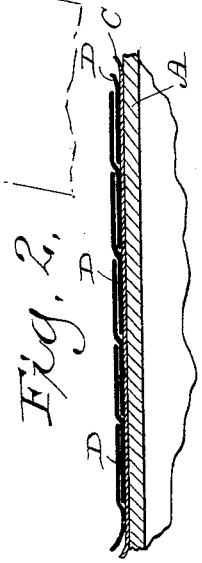
Witnesses
Geo. W. Young.
N. E. Oliphant
Inventor
Frank H. Bolte,
By H. G. Underwood,
Attorney

UNITED STATES PATENT OFFICE.

FRANK H. BOLTE, OF MILWAUKEE, WISCONSIN, ASSIGNOR OF ONE-HALF TO PARKER H. SERCOMBE, OF SAME PLACE.

PNEUMATIC TIRE.

SPECIFICATION forming part of Letters Patent No. 479,203, dated July 19, 1892.

Application filed August 31, 1891. Serial No. 404,243. (No model.)

*To all whom it may concern:*

Be it known that I, FRANK H. BOLTE, a citizen of the United States, and a resident of Milwaukee, in the county of Milwaukee, and in the State of Wisconsin, have invented certain new and useful Improvements in Pneumatic Tires; and I do hereby declare that the following is a full, clear, and exact description thereof.

The present invention has the same object as the one set forth in my application for patent filed August 21, 1891, Serial No. 403,292—viz., to provide a pneumatic tire devoid of an inner expansible tube, as well as one that cannot be easily punctured, but which if punctured may be readily repaired; and to this end the said invention consists in certain peculiarities of construction and combination of parts to be hereinafter described with reference to the accompanying drawings, and subsequently claimed.

In the drawings, Figure 1 represents a plan view of a portion of a pneumatic tire constructed according to my invention, and Figs. 2 and 3 sections respectively taken on lines 2 2 and 3 3 of the preceding figure. Fig. 4 represents an elevation of an endless tube of vulcanized caoutchouc, partly in section, and partially reinforced with peculiarly-arranged strips of fibrous material.

Referring by letter to the drawings, A represents an endless tube of vulcanized caoutchouc constructed in accordance with the method set forth in detail in my previous application and reinforced by inner and outer circumferential strips B C of canvas or other fibrous material. As set forth in my previous application, the fibrous strips B C are stretched and treated to a coating of caoutchouc mixed with vulcanizing ingredients previous to being laid on the tube, the latter and said strips being vulcanized together in one piece.

The strips B C serve as braces to prevent circumferential stretching of the tubular base A, and these bracing-strips having been placed in position on said tubular base the latter and said strips are wrapped by a spirally-disposed reinforcing-strip D, also of canvas or other fibrous material, that has been previously stretched and treated to a coating of caoutchouc mixed with vulcanizing ingredients, this wrapping being done previous to the vulcanizing process of the aforesaid tubular base and circumferential bracing-strips, whereby in the completed tire all of the parts composing the same are rigidly united.

The reinforcing-strip D is wrapped so as to overlap about one-half of itself throughout its length, and thus practically form two thicknesses of spirally-disposed fibrous material at all points on the base of the completed tube. The wrapping-strip D may be continuous or a series of such strips, one beginning where the other ends, may be employed as a matter of convenience.

The circumferential bracing-strips are so disposed that the one B is on the rim side of the tubular base A and the one C on the tread side of said base, these being the sides that are most liable to puncture, and the reinforcing-strip D being wrapped around the former strips throughout their length there are three thicknesses of the fibrous material on said rim and tread sides of the aforesaid base, or, in other words, the disposition of the layers of fibrous material is proportionate to the liability of the completed tire to wear or puncture.

By the construction and arrangement above described I form a tire that is non-expansible under inflation with air, gas, or other fluid under pressure and very difficult to puncture under any of the conditions to which a pneumatic tire is ordinarily subjected. The endless reinforced tube may be sufficient as a tire, or it may be inclosed within an outer protective covering similar to the one set forth in my previous application, and, as shown, said tube is preferably arch-shaped in cross-section, and upon inflation said tube has a tendency to change its cross-section shape from an arch to an oval, and thus hug tight upon the wheel-rim to which it may be fitted.

This application contains features set forth in another application, Serial No. 423,821, filed by me on March 5, 1892, the matter common to both being a single pneumatic tire comprising a previously-formed tube of caoutchouc shaped on a ring-like mandrel, preferably braced by circumferential strips of fibrous material and enveloped with a reinforce of similar material, the braced and reinforced tube being joined at its ends after withdrawal from the mandrel and vulcanized. The herein-described mandrel is also shown and described in my application, Serial No. 425,570, filed March 19, 1892, and in this latter application said mandrel is covered with a fibrous material, to which the caoutchouc is subsequently applied, the ultimate product being a single-tube pneumatic tire.

Having thus described my invention, what I claim is—

1. A pneumatic tire comprising an endless tube of caoutchouc vulcanized in one piece with a practically-continuous strip of fibrous material that is spirally disposed and so wound as to overlap about one-half of itself throughout its length, and thus form two thicknesses at all points, substantially as set forth.

2. A pneumatic tire comprising an endless tube of caoutchouc vulcanized in one piece with circumferential bracing-strips of fibrous material and a practically-continuous strip of like material spirally disposed and so wound as to overlap about one-half of itself throughout its length, substantially as set forth.

In testimony that I claim the foregoing I have hereunto set my hand, at Milwaukee, in the county of Milwaukee and State of Wisconsin, in the presence of two witnesses.

FRANK H. BOLTE.

Witnesses:
N. E. OLIPHANT,
H. H. MEIXSELL.